(12) United States Patent
Aoyagi et al.

(10) Patent No.: US 9,003,975 B2
(45) Date of Patent: Apr. 14, 2015

(54) GAS GENERATOR

(75) Inventors: Satoshi Aoyagi, Hyogo (JP); Koichi Enami, Hyogo (JP)

(73) Assignee: Nipponkayaku Kabushikikaisha, Tokyo (JP)

( * ) Notice: Subject to any disclaimer, the term of this patent is extended or adjusted under 35 U.S.C. 154(b) by 0 days.

(21) Appl. No.: 13/264,380

(22) PCT Filed: Mar. 16, 2010

(86) PCT No.: PCT/JP2010/001875
§ 371 (c)(1),
(2), (4) Date: Oct. 13, 2011

(87) PCT Pub. No.: WO2010/119613
PCT Pub. Date: Oct. 21, 2010

(65) Prior Publication Data
US 2012/0031294 A1 Feb. 9, 2012

(30) Foreign Application Priority Data
Apr. 15, 2009 (JP) ................................. 2009-099105

(51) Int. Cl.
*B60R 21/26* (2011.01)
*B60R 21/264* (2006.01)
*F16B 17/00* (2006.01)

(52) U.S. Cl.
CPC ... *B60R 21/2644* (2013.01); *B60R 2021/26076* (2013.01); *F16B 17/004* (2013.01)

(58) Field of Classification Search
USPC ............................ 102/530, 531; 280/736, 741
See application file for complete search history.

(56) References Cited

U.S. PATENT DOCUMENTS

| 6,244,623 | B1 * | 6/2001 | Moore et al. |
| 6,447,008 | B1 * | 9/2002 | Karlin et al. |
| 6,557,890 | B1 * | 5/2003 | Karlin et al. |
| 6,739,362 | B2 * | 5/2004 | Lell ............................... 141/313 |
| 6,779,812 | B2 * | 8/2004 | Ishida et al. |

(Continued)

FOREIGN PATENT DOCUMENTS

| DE | 10028169 A1 | 12/2001 |
| DE | 10160242 A1 | 6/2003 |

(Continued)

OTHER PUBLICATIONS

Extended European Search Report, Application No. 10764200.1, Issued Aug. 29, 2012.

(Continued)

*Primary Examiner* — James Bergin
(74) *Attorney, Agent, or Firm* — Peters Verny, LLP

(57) ABSTRACT

Provided is a gas generator which is reduced in weight and size while maintaining a sufficient strength as a pressure vessel. A gas generator (1) includes a housing (4) in a tubular shape having an opening (10) on at least one end thereof and a plug (12) inserted in the opening (10), so that an end portion (11) on the opening side is reduced in diameter and caulked in a caulking groove (13) of the plug (12), to thereby seal the opening (10), in which: the caulking groove (13) is a streak groove that extends along the periphery of the plug (12) and is rectangular in section; and the caulking groove (13) has at least one of side walls (14) forming the calking groove (13), the one side wall (14a) being closer to the center of the housing, which is orthogonal or sloped to the opening side, with respect to the axis (X) of the housing (4).

14 Claims, 3 Drawing Sheets

(56) References Cited

U.S. PATENT DOCUMENTS

| | | | |
|---|---|---|---|
| 7,007,610 B2 * | 3/2006 | Karlin et al. | 102/531 |
| 8,011,302 B2 * | 9/2011 | Abaziou | 102/530 |
| 8,028,627 B2 * | 10/2011 | Zhang | 102/530 |
| 8,074,571 B2 * | 12/2011 | Hirooka et al. | 102/202.14 |
| 2008/0111359 A1 * | 5/2008 | Abaziou | 280/741 |
| 2011/0265678 A1 * | 11/2011 | Sasamoto et al. | 102/530 |
| 2012/0042801 A1 * | 2/2012 | Sasamoto et al. | 102/530 |
| 2012/0048137 A1 * | 3/2012 | Hagihara et al. | 102/530 |

FOREIGN PATENT DOCUMENTS

| | | | |
|---|---|---|---|
| GB | 2280250 A | 1/1995 | |
| JP | 63-194240 U | 12/1988 | |
| JP | 08-253100 A | 10/1996 | |
| JP | 10-274216 A | 10/1998 | |
| JP | 2004-337854 A | 12/2004 | |
| JP | 2004-337954 A | 12/2004 | |
| JP | 2005-313752 A | 11/2005 | |
| JP | 3134430 U | 7/2007 | |
| JP | 2008-296763 A | 11/2008 | |
| JP | 2008-290528 A | 12/2008 | |
| JP | 2009-41701 A | 2/2009 | |

OTHER PUBLICATIONS

English Translation of the Abstract of DE10028169.
English Translation of the Abstract of DE10160242.
CN Office Action, Application No. 201080023720X, Dated Mar. 4, 2013.
EP Office Action, Application No. 10764200.1, Dated Apr. 9, 2013.
Office action issued in corresponding Chinese patent application No. 201080023720.X, dated Oct. 25, 2013.
Translation of office action issued in corresponding Chinese patent application No. 201080023720.X, dated Oct. 25, 2013.
Office action and translation issued in Japanese patent application No. 2009-099105, dated Oct. 1, 2013.
EESR issued in EPO, application No. 13188116.6, dated Nov. 6, 2013.
Office action issued in corresponding Japanese patent application No. 2009-099105, dated Feb. 13, 2014.
Translation of office action issued in corresponding Japanese patent application No. 2009-099105, dated Feb. 13, 2014.
EP 13 188 116.1 Communication Pursuant to Article 94(3) EPC, Oct. 23, 2014.
CN 201080023720.X non-final Office Action, mailed Jun. 12, 2014.

* cited by examiner (a)

(b)

GAS GENERATOR

TECHNICAL FIELD

The present invention relates to a gas generator for generating a high-pressure gas to be introduced into an airbag, which is reduced in weight and size while maintaining a sufficient strength as a pressure vessel.

RELATED ART

A side airbag system is known as a safety system for protecting passengers in an automobile from an impact generated at the time of a collision of the automobile. The side airbag system is inflated by a large amount of a high-temperature, high-pressure gas which is generated by a gas generator and filled in the airbag, so as to function as a safety system. As disclosed in JP H08-253100 A, a conventional gas generator employs a hybrid system which employs gas cylinders each having a high-pressure gas sealed therein and a small amount of an explosive composition for supplying heat to the high-pressure gas contained in each cylinder, to thereby generate a large amount of a high-temperature, high-pressure gas.

However, the gas generator described in JP H08-253100 A has a bottleneck in that the high cost of the cylinders results in a large increase in the unit price of the gas generator. In view of this, JP 2005-313752A discloses a gas generator capable of generating a high-temperature, high-pressure gas through combustion of a gas generating agent filled in the gas generator, without using a cylinder. This gas generator includes, inside a housing, a gas generating agent, an igniter for igniting the gas generating agent, and a filter for cooling the high-temperature, high-pressure gas generated from the gas generating agent and filtering the same. In the manufacture of the gas generator, a plug formed of steel is finally inserted in an opening of the housing which has the above-mentioned components arranged therein, and an end portion on the opening side is swaged in a swaging groove of the plug so as to seal the opening, so that the gas generator has a sealed structure as a pressure vessel.

DISCLOSURE OF THE INVENTION

Problems to be Solved by the Invention

In recent years, in view of improving safety of passengers in an automobile, the number of airbags to be installed in an automobile is increasing. Along with the increase, the number of gas generators to be used for each automobile is also increasing. However, the increase in the number of airbag systems installed in an automobile leads to the following problems. That is, the automobile is increased in weight, which results in a reduction in fuel efficiency. Further, an extra space is required to accommodate a plurality of airbag systems, which reduces the interior space of the automobile, impairing the comfort of the passengers. In view of these problems, a gas generator reduced in weight and size while maintaining a sufficient strength is desired.

Therefore, it is an object of the present invention to provide a gas generator which is reduced in weight and size while maintaining a sufficient strength as a pressure vessel, through optimization of the structure and constituent material thereof.

Means for Solving the Problem

In order to achieve the aforementioned object, a gas generator according to the present invention includes a housing in a tubular shape having an opening on least one end thereof and a plug inserted in the opening, so that an end portion on the opening side is reduced in diameter and swaged in a swaging groove of the plug, to thereby seal the opening, in which: the swaging groove is a streak groove that extends along the periphery of the plug and is rectangular in section; and the swaging groove has at least one of side walls forming the calking groove, the one side wall being closer to the center of the housing, which is orthogonal or sloped to the opening side, with respect to the axis of the housing. With such a configuration, the plug becomes unlikely to be pulled out even under the load of internal pressure, so that the gas generator can be increased in strength as a pressure vessel. Further, the configuration thus prevents the plug from being pulled out, with the result that the plug can be reduced in size, which also reduces the weight thereof.

Further, the plug may preferably be formed of aluminum, an aluminum alloy, a titanium alloy, or a magnesium alloy. The reason is as follows. When the plug is formed of the above-mentioned metal under the above-mentioned plug shape, particularly preferably, the plug shape having a side wall sloped to the opening side thus employed, the gas generator can be reduced in weight as compared to the case of using a plug made of steel.

Further, the swaging groove may preferably have a depth that falls within a range of 0.02 to 0.35 times of a diameter of the plug, because the depth of the swaging groove falling within the above-mentioned range is preferred in view of ensuring the strength of the gas generator while reducing weight and size thereof.

Still further, the swaging groove may preferably have a groove width that falls within a range of 0.02 to 0.20 times of a diameter of the plug, because the groove width of the swaging groove falling within the above-mentioned range is preferred in view of ensuring the strength of the gas generator while reducing weight and size thereof.

EFFECTS OF THE INVENTION

According to the present invention, a gas generator can be provided that is reduced in weight and size while maintaining the strength as a pressure vessel, through optimization of the structure of the plug sealing the opening of the housing of the gas generator. Further, the material for forming the plug is appropriately selected under the above-mentioned configuration of attaching the plug, to thereby further reduce the weight and size of the gas generator.

BEST MODES FOR CARRYING OUT THE INVENTION

Figure 2:
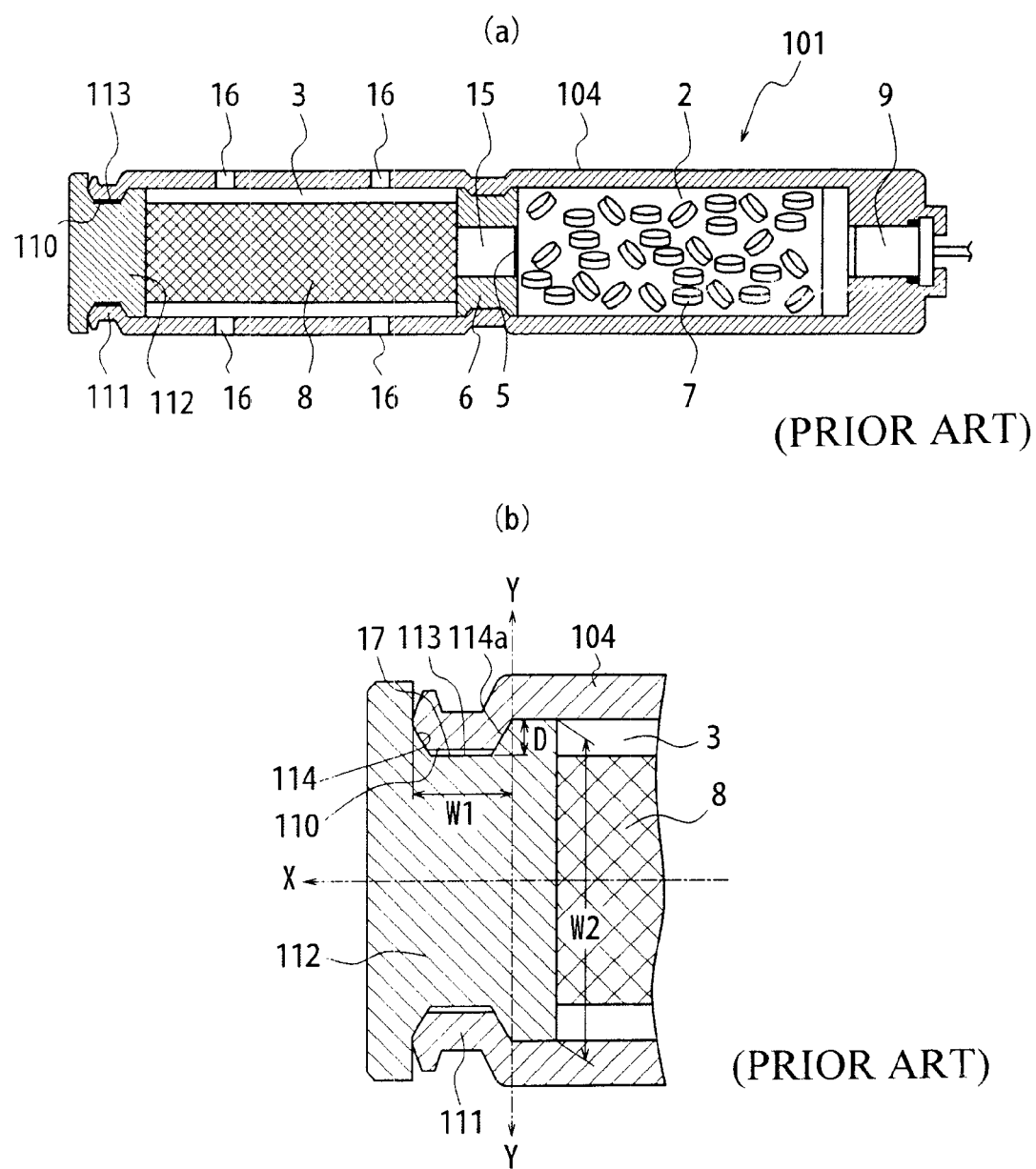
FIG. 2(a) is a sectional view in the width direction of a conventional gas generator.
FIG. 2(b) is a partially enlarged view of the gas generator of FIG. 2(a).
Figure 3:
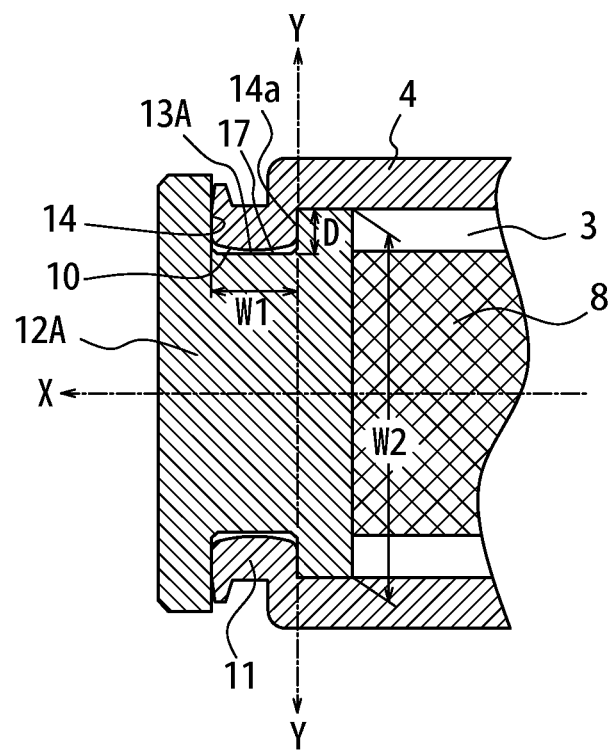
FIG. 3 is a partially enlarged view of a cross section in the width direction of another gas generator according to the present invention.
Figure 4:
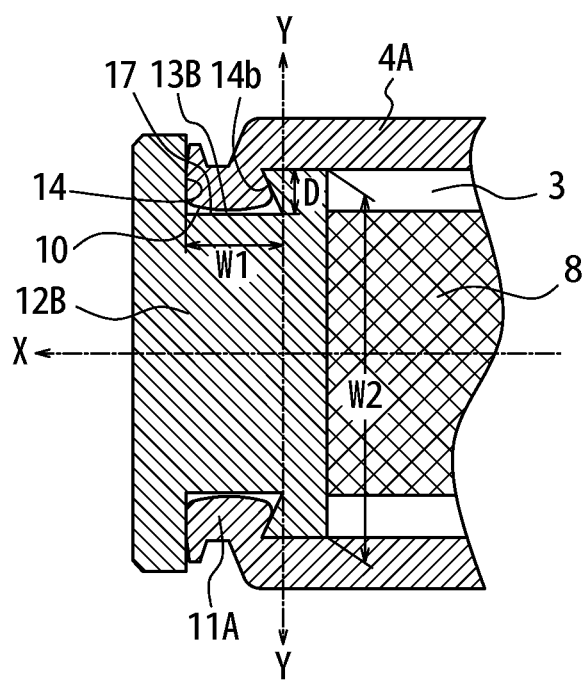
FIG. 4 is a partially enlarged view of a cross section in the width direction of further another gas generator according to the present invention.

Next, with reference to the drawings, embodiments of the present invention are described. FIG. 1(a) is a sectional view in the width direction of a gas generator according to the present invention, and FIG. 1(b) is a partially enlarged view of the gas generator of FIG. 1(a). FIG. 2(a) is a sectional view in the width direction of a conventional gas generator, and FIG. 2(b) is a partially enlarged view of the gas generator of FIG. 2(a). FIGS. 3 and 4 each are a partially enlarged view of a cross section in the width direction of each of other gas generators according to the present invention.

Figure 1:
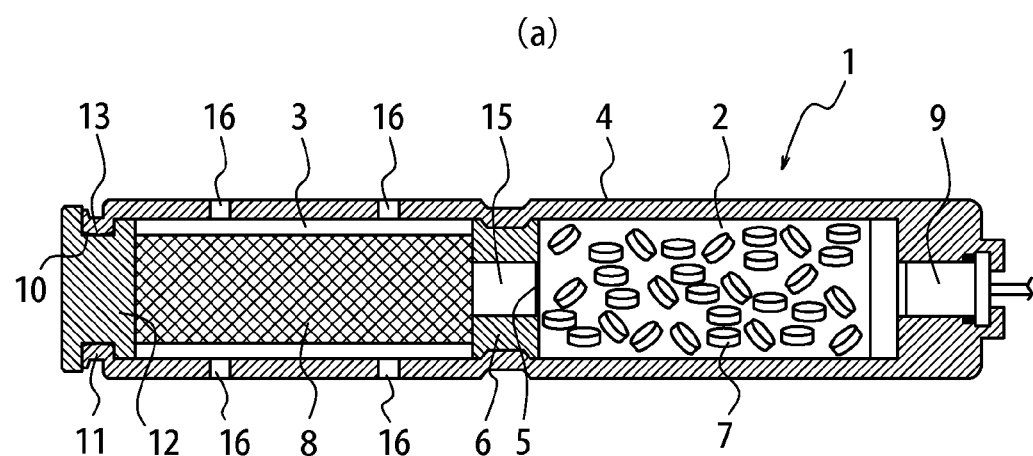
FIG. 1(a) is a sectional view in the width direction of a gas generator according to the present invention.
FIG. 1(b) is a partially enlarged view of the gas generator of FIG. 1(a).
Figure 1:
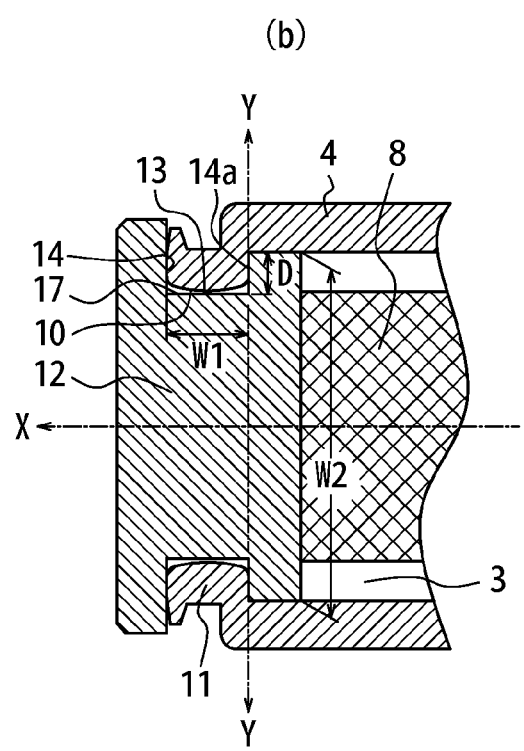

The gas generator 1 illustrated in FIG. 1 has a two-chamber structure formed of a gas generation chamber 2 and a filter chamber 3 which are connected in series and compartmented by a tubular housing 4 and a partition plate 6 having a rupture disk 5. The gas generation chamber 2 is filled with a gas generating agent 7 in the form of pellets containing a non-azide metal compound. The filter chamber 3 accommodates a filter 8 for capturing and cooling slag of the gas. Further, an igniter 9 for igniting and combusting the gas generating agent 7 in the gas generation chamber 2 is attached to an end of the housing 4 on the gas generation chamber 2 side. The housing 4 has an end portion 11 reduced in diameter and swaged in a swaging groove 13 of a plug 12 so that an opening 10 of the housing 4 is fixed and sealed. The fixing method through swaging employed in this case is called multi-directional swaging in which the end portion 11 on the opening side of the housing 4 has a diameter uniformly reduced inward in a radial direction. The swaging groove 13 is a streak groove that has a rectangular section and extends along the periphery of the plug 12. Of the side walls 14 forming the swaging groove 13, a side wall 14a closer to the center of the housing is orthogonal to an axis X of the housing 4.

In the following, description is given of the working principle of the airbag system which serves as a safety system upon actuation of the above-mentioned gas generator 1. First, upon collision of an automobile, a collision sensor outputs a collision detection signal, and the signal is received by the igniter 9. The collision detection signal thus received causes the igniter 9 to be activated with a current and ignited, and a flame flows into the gas generation chamber 2. The flame that has thus flowed into ignites and combusts the gas generating agent 7, with the result that a large amount of a high-temperature, high-pressure gas is generated from the gas generating agent 7. The high-temperature, high-pressure gas thus generated increases internal pressure of the gas generation chamber 2 to a predetermined value or more, so as to rupture the rupture disk 5, so that the gas passes through a hole 15 of the partition plate 6 to flow into the filter chamber 3. Then, the high-temperature, high-pressure gas is subjected to slag collection process and cooling process by the filter 8, and fed into the airbag via gas vent holes 16 formed in the filter chamber 3. As a result, the air bag is rapidly inflated and deployed so as to serve as a cushion for passengers during collision, to thereby ensure the safety of the passengers.

The inventors have made an extensive study of a method of reducing size and weight of the gas generator 1 while maintaining the strength as a pressure vessel, and obtained findings as follows. A gas generator 101 of a conventional art as illustrated in FIG. 2 generally has a plug 112 and a housing 104 that are made of steel, which are fixed to each other through welding or swaging. Here, in order to reduce weight of the conventional gas generator 101, if the plug 112 is formed of, for example, aluminum which is lower in density than steel, the plug 112 and the housing 104 are formed of different kinds of metals, which leads to a problem that it is difficult to fix the plug 112 and the housing 104 through welding, and the welded part is reduced in strength. Therefore, even if the plug 112 is formed of aluminum, the end portion 111 of the housing 104 on the opening 110 side still needs to be reduced in diameter and swaged in the swaging groove 113 of the plug 112 so as to be fixed, as illustrated in FIG. 2, similarly to the case of using the steel plug 112. However, as illustrated in FIG. 2, of the side walls 114 forming the swaging groove 13, a side wall 114a closer to the center of the housing is sloped to the center of the housing with respect to the axis X of the housing 104, and hence, when the plug 112 and the housing 104 are fixed to each other using a friction force generated between the wall surfaces of the plug 112 and the housing 104 on the center side of the housing 104, the aluminum plug 112 is deformed under a pressure applied within the gas generator 101 because the aluminum plug 112 is significantly lower in hardness than the steel plug 112. Further, the housing 104 is increased in diameter and deformed due to an increase in internal pressure of the gas generator 101, with the result that sufficient friction force at the wall surfaces cannot be ensured. As a result, when the pressure increases inside the gas generator 101, the plug 112 cannot withstand the internal pressure and is pulled out, leading to a fear that gas be released, not only through the gas vent holes 16, but also through the open end portion 111 of the housing 104.

In view of the above-mentioned problems, the inventors have found out the followings. That is, as illustrated in FIG. 1(b), when the swaging groove 13 of the plug 12 is formed as a streak groove having a rectangular cross section extending along the periphery of the plug 12, and further, of the side walls 14 forming the swaging groove 13, a side wall 14a closer to the center of the housing is made orthogonal to an axis X of the housing 4 or sloped to the opening 10 side, the wall surface of the housing 4 is hooked onto the wall surface of the plug 12 so as to be latched thereonto, with the result that, as compared to the above-mentioned fixing through the friction force, the plug 12 can be more securely fixed to the housing 4. Further, the inventors have also found out that, even if the housing is increased in diameter and deformed due to an increase of internal pressure of the gas generator 1, such a deformation rather increases the hooking and latching capability. Accordingly, through the employment of the above-mentioned configuration, even when the plug 12 is formed of, for example, aluminum, which is lower in density and hardness than steel, the gas generator can still be reduced in weight while maintaining sufficient strength as a pressure vessel. Further, when the plug is formed in the above-mentioned shape, the plug 12 can be sufficiently latched onto the housing 4 to be securely fixed thereto even when the groove width W1 and the depth D of the swaging groove 13 formed in the plug 12 are reduced, so that the gas generator 1 can also be reduced in size. At this time, it should be duly noted that the side wall 14a closer to the center of the housing 4 is made orthogonal to an axis X of the housing 4 or sloped to the opening 10 side only after the housing 4 is swaged in the plug 12, not before the housing 4 is swaged in the plug 12. The swaging groove of the plug may also be in another shape. For example, as illustrated in FIG. 3, a groove bottom 17 of a swaging groove 13A of the plug 12A may be chamfered at corners. Alternatively, as illustrated in FIG. 4, a side wall 14b of a swaging groove 13b of a plug 12B, the side wall 14b being closer to the center of a housing 4A, may be sloped to the opening 10 side (that is, in a radial direction Y of the housing 4A) by 70 degrees with respect to the axis X rather than being orthogonal to the axis X, so that an open end 11A of the housing 4A may be swaged so as to be deformed in a shape that corresponds to the shape of the swaging groove 13B.

Further, the plug 12 (12A, 12B) may preferably be formed of, other than aluminum as described above, an aluminum alloy, a titanium alloy, or a magnesium alloy, which are lower in hardness and density than steel. The composition, the content, the combination, and the like of the metal material to be selected may be changed as appropriate according to the performance desired for the gas generator.

Further, the swaging groove 13 (13A, 13B) may preferably be formed to have the depth D that falls within a range of 0.02 to 0.35 times of a diameter W2 of the plug 12 (12A, 12B). The reason is as follows. When the depth D of the swaging groove 13 (13A, 13B) exceeds 0.35 times of the diameter W2 of the plug 12 (12A, 12B), the latching ability of the plug 12(12A, 12B) with respect to the housing 4 (4A) is increased, whereas it takes more time in the process of swaging the housing 4 (4A) in the plug 12 (12A, 12B) at the time of manufacture, which may lead to a reduction in productivity. On the other hand, when the depth D of the swaging groove 13 (13A, 13B) is smaller than 0.02 times of the diameter W2 of the plug 12 (12A, 12B), it takes less time in the process of swaging the housing 4 (4A) in the plug 12 (12A, 12B) and the productivity may be increased, whereas the housing 4 (4A) is latched onto the plug 12 (12A, 12B) at a portion that is so small that the latching capability of the housing 4 (4A) with respect to the plug 12 (12A, 12B) may become insufficient.

Still further, the swaging groove 13 (13A, 13B) may preferably be formed to have the groove width W1 that falls within a range of 0.02 to 0.20 times of the diameter W2 of the plug 12 (12A, 12B). The reason is as follows. When the groove width W1 of the swaging groove 13 (13A, 13B) exceeds 0.20 times of the diameter W2 of the plug 12 (12A, 12B), the plug 12 (12A, 12B) is excessively increased in size in the axial direction X, which may lead to a hindrance in reducing the size of the gas generator 1. On the other hand, when the groove width W1 of the swaging groove 13 (13A, 13B) is smaller than 0.02 times of the diameter W2 of the plug 12 (12A, 12B), the gas generator 1 may be reduced in size, whereas the housing 4 (4A) is latched onto the plug 12 (12A, 12B) at a portion that is so small that the latching capability of the housing 4 (4A) with respect to the plug 12 (12A, 12B) may become insufficient.

The rupture disk 5 is formed of a metal foil, such as an aluminum foil, that has a slit made therein, and serves as a function of preventing moisture from entering inside the gas generation chamber 2 and adjusting the internal pressure of the gas generation chamber 2. This configuration prevents moisture from entering into the gas generation chamber 2, even during the time other than collision. The slit is formed so that the rupture disk 5 is cut through when a gas is generated upon collision so as to allow the gas to smoothly flow into the filter chamber 3. Further, the filter 8 may be configured as a combination of a knitted wire mesh, and a crimp weave or plain weave metal wire rod.

Further, as the gas generating agent 7, other than the above-mentioned gas generating agent 7 that contains a non-azide metal compound, the gas generating agent 7 that contains a nitrogen organic compound may also be employed so as to achieve stable ignition and combustion performance. As the gas generating agent 7 that contains a nitrogen organic compound, there may be employed a gas generating agent that contains, as a combustion component, a nitrogen-containing organic compound such as a tetrazole-based compound, a triazole-based compound, an amide-based compound, and a guanidine-based compound. The gas generating agent 7 may be in the form of pellets as illustrated, but not limited thereto, and may also be in the form of disks, granules, cylinders, and hollow cylinders.

The above-mentioned gas generator 1 illustrated in FIG. 1 is manufactured as follows. First, the igniter 9 is attached to one end of the housing 4, and the end portion of the housing is reduced in diameter to be swaged in, to thereby fix the igniter 9. Next, a cushion, the gas generating agent 7, and the partition plate 6 are installed in this order in the gas generation chamber 2, and the housing is circumferentially reduced in diameter and swaged in an area where the partition plate 6 is attached, to thereby fix the partition plate 6. Then, the filter 8 is accommodated in the filter chamber 3, and the other end portion 11 of the housing 4 is reduced in diameter to be swaged in the swaging groove 13 of the plug 12, so as to seal the housing, to thereby obtain the gas generator 1 serving as a pressure vessel.

It should be noted that the above-mentioned embodiments are merely exemplified as part of the present invention, and these configurations may be combined to one another or may be subjected to various alternations without departing from the gist of the present invention. For example, the gas generator of the illustrated example employs a configuration in which only one end of the housing is sealed by the plug. However, the gas generator according to the present invention is not limited thereto. Although not shown, a configuration in which the housing is sealed at both ends thereof by the plug may also be adopted.

INDUSTRIAL APPLICABILITY

As is apparent from the description above, the present invention is capable of providing a gas generator which is reduced in weight and size while maintaining a sufficient strength as a pressure vessel, through optimization of the structure and constituent material thereof.

DESCRIPTION OF SYMBOLS 1, 101 gas generator
2 gas generation chamber
3 filter chamber
4, 104, 4A housing
5 rupture disk
6 partition plate
7 gas generating agent
8 filter
9 igniter
10, 110 opening
11, 111, 11A open end portion
12, 112, 12A, 12B plug
13, 113, 13A, 13B swaging groove
14 side wall of swaging groove
14a, 114a, 14b side wall closer to the center of housing
15 hole of partition plate
16 gas vent hole
17 groove bottom of swaging groove
X axis of housing
Y radial direction of housing

The invention claimed is:
1. A gas generator which includes:
a housing having a tubular shape of a selected longitudinal length having an opening at at least one end thereof;
a plug with a swaging groove defined around the periphery thereof inserted in the opening of the housing; and
multi-directional swaging between the swaging groove of the plug and an inner surface of an end portion of the opening of the housing so that an end portion on the opening of the housing is reduced in diameter by the multi-directional swaging swaged in the swaging groove of the plug, to thereby seal the opening;

wherein the housing is made of steel, and the plug is formed of a metal which is lower in hardness and density than steel;

wherein the gas generator has a gas generation chamber and a filter chamber which are compartmented by the housing such that these chambers are connected in series; and wherein at least one side wall, of the side walls forming the swaging groove, being closer to a midpoint along the longitudinal length of the housing is orthogonal with respect to the central longitudinal axis of the housing.

2. The gas generator according to claim 1, wherein the plug is formed of one of aluminum, an aluminum alloy, a titanium alloy, and a magnesium alloy.

3. The gas generator according to claim 2, wherein the swaging groove has a depth that falls within a range of 0.02 to 0.35 times of a diameter of the plug.

4. The gas generator according to claim 2, wherein the swaging groove has a groove width that falls within a range of 0.02 to 0.20 times of the diameter of the plug.

5. The gas generator according to claim 1, wherein the swaging groove has a depth that falls within a range of 0.02 to 0.35 times of a diameter of the plug.

6. The gas generator according to claim 5, wherein the swaging groove has a groove width that falls within a range of 0.02 to 0.20 times of the diameter of the plug.

7. The gas generator according to claim 1, wherein the swaging groove has a groove width that falls within a range of 0.02 to 0.20 times of the diameter of the plug.

8. A gas generator which includes:
   a housing having a tubular shape of a selected longitudinal length having an opening at at least one end thereof;
   a plug with a swaging groove defined around the periphery thereof inserted in the opening of the housing; and
   multi-directional swaging between the swaging groove of the plug and an inner surface of an end portion of the opening of the housing so that an end portion on the opening of the housing is reduced in diameter by the multi-directional swaging swaged in the caulking groove of the plug, to thereby seal the opening;

wherein the housing is made of steel, and the plug is formed of a metal which is lower in hardness and density than steel;

wherein the gas generator has a gas generation chamber and a filter chamber which are compartmented by the housing such that these chambers are connected in series; and wherein at least one side wall, of the side walls forming the swaging groove, being closer to a midpoint along the longitudinal length of the housing is sloped toward the opening of the housing, in which the plug is inserted, with respect to the central longitudinal axis of the housing.

9. The gas generator according to claim 8, wherein the plug is formed of one of aluminum, an aluminum alloy, a titanium alloy, and a magnesium alloy.

10. The gas generator according to claim 9, wherein the swaging groove has a depth that falls within a range of 0.02 to 0.35 times of the diameter of the plug.

11. The gas generator according to claim 9, wherein the swaging groove has a groove width that falls within a range of 0.02 to 0.20 times of the diameter of the plug.

12. The gas generator according to claim 8, wherein the swaging groove has a depth that falls within a range of 0.02 to 0.35 times of the diameter of the plug.

13. The gas generator according to claim 12, wherein the swaging groove has a groove width that falls within a range of 0.02 to 0.20 times of the diameter of the plug.

14. The gas generator according to claim 8, wherein the swaging groove has a groove width that falls within a range of 0.02 to 0.20 times of the diameter of the plug.

* * * * *